(12) United States Patent
Xia et al.

(10) Patent No.: US 10,790,908 B1
(45) Date of Patent: Sep. 29, 2020

(54) OPTICAL COMMUNICATION LINK IDENTIFIER

(71) Applicant: Verizon Patent and Licensing Inc., Arlington, VA (US)

(72) Inventors: Tiejun J. Xia, Richardson, TX (US); Glenn A Wellbrock, Wylie, TX (US); Joe J. Thompson, Aubrey, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/376,880

(22) Filed: Apr. 5, 2019

(51) Int. Cl.
*H04B 10/079* (2013.01)
*H04B 10/25* (2013.01)
*H04B 10/61* (2013.01)
*H04B 10/50* (2013.01)

(52) U.S. Cl.
CPC ..... *H04B 10/25891* (2020.05); *H04B 10/079* (2013.01); *H04B 10/50* (2013.01); *H04B 10/6162* (2013.01)

(58) Field of Classification Search
CPC .................................................. H04B 10/079
See application file for complete search history.

(56) References Cited

U.S. PATENT DOCUMENTS

| | | | | |
|---|---|---|---|---|
| 4,793,678 A | * | 12/1988 | Matsumoto | G02B 6/105 359/489.01 |
| 5,202,746 A | * | 4/1993 | Sentsui | H04B 10/25 250/227.17 |
| 5,781,285 A | * | 7/1998 | Mampaey | G01M 11/35 356/73.1 |
| 2003/0081874 A1 | * | 5/2003 | Yao | G02F 1/0136 385/11 |
| 2005/0041902 A1 | * | 2/2005 | Frigo | G01M 11/30 385/1 |
| 2013/0077151 A1 | * | 3/2013 | Yao | G02F 1/0136 359/290 |
| 2014/0078511 A1 | * | 3/2014 | Sanborn | G02B 6/2706 356/491 |
| 2016/0191162 A1 | * | 6/2016 | Kim | H04B 10/2569 398/29 |

FOREIGN PATENT DOCUMENTS

CN          207851406 U  *  9/2018  ............. G02B 26/00

* cited by examiner

*Primary Examiner* — Nathan M Cors

(57) ABSTRACT

An actuator device can include a plate, an actuator, a connector, and a power unit. The plate can retain a section of an optical fiber at the transmitter end of an optical communication link. The section of the optical fiber can be wrapped in at least a partial loop and held or retained by the plate. The connector can be a mechanical connector that couples the plate to the actuator and enables the plate to move about at least one axis to cause a change in a polarization state of the optical signal carried by the optical fiber. The change in the polarization state is identifiable by a polarized photodetector near a receiver end of the optical communication link. The power unit can provide power to at least the actuator.

20 Claims, 5 Drawing Sheets

OPTICAL COMMUNICATION LINK IDENTIFIER

BACKGROUND

An optical network relies on optical signals to exchange information between network devices of a network, such as a telecommunications network. Information is encoded as pulses of light and carried to different network devices using combinations of lasers or light emitting diodes (LEDs), optical amplifiers, repeaters, and other supporting network devices. The network devices of an optical network are generally comprised of optical transmitters and/or optical receivers which exchange optical signals via interconnected arrays of optical fibers. An optical communication link is formed when an optical fiber is connected between an optical transmitter and an optical receiver and is capable of transmitting an optical signal from the optical transmitter to the optical receiver.

DETAILED DESCRIPTION OF PREFERRED EMBODIMENTS

Figure 1A:
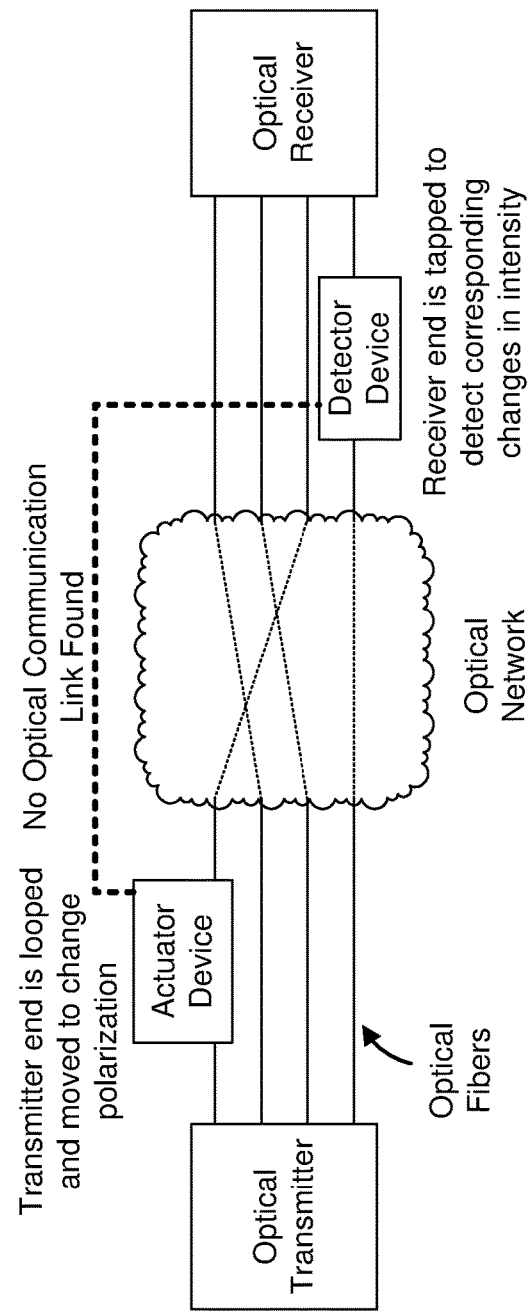
FIGS. 1A-1B are diagrams of one or more example implementations described herein.

The following detailed description of example implementations refers to the accompanying drawings. The same reference numbers in different drawings can identify the same or similar elements.

Technology has improved functioning of optical networks, by increasing bandwidth available on the optical networks and, thus, the volume of traffic that can be carried by the optical networks. As a result, optical network service providers have increased reliance on optical networks to carry traffic. Thus, it has become a common interest among optical network service providers to reduce unnecessary downtime, such as by maintaining network connectivity and expediting necessary repairs.

Optical network service providers often dispatch field technicians to identify an optical communication link (e.g., to test connectivity) between network devices within an optical network. For shorter optical communication links (e.g., approximately 10 kilometers or less), field technicians typically inject visible light into a transmitter end of an optical fiber, and visually check for corresponding light at a receiver end of the optical fiber. For longer optical communication links (e.g., approximately 10 kilometers or longer), field technicians typically inject infrared light into a transmitter end of an optical fiber, and use an infrared detector at a receiver end of the optical fiber to identify optical communication links.

Such systems for testing optical communication links have room for improvement. Using visible light allows field technicians to identify individual optical communication links within an array of optical fibers, but is limited in range and ineffective over longer distances. Using infrared light can test optical fibers over longer distances, but cannot distinguish between individual optical communication links within an array of optical fibers. These systems are thus inadequate for identifying individual optical communication links within an array of optical fibers that extend over longer distances. Furthermore, these systems typically require field technicians to disconnect optical fibers to inject an external light source, which can introduce unwanted service interruptions, cause damage, and prolong downtime.

Some implementations described herein identify optical communication links without relying on external light sources and without the various drawbacks discussed above. In some implementations, a section of a transmitter end of an optical fiber is physically manipulated to cause a change in an optical signal, carried by the optical fiber, that is detectable at a receiver end of the optical fiber. In some implementations, the optical fiber is wrapped or formed into one or more loops and moved at a particular frequency to cause corresponding changes in a polarization state in the optical signal. In some implementations, the receiver end of the optical fiber is tapped to detect corresponding changes in intensity in the optical signal. In some implementations, detected changes in intensity are used to distinguish and identify individual optical communication links.

In this way, optical network service providers are able to identify optical communication links in less time, with fewer resources, at lower cost, and with reduced service interruptions. By relying on live optical signals that are already sufficiently powered to reach the desired ranges, field technicians can use a single system to test optical fibers of varying lengths. Also, by leveraging optical signals that are already in use, field technicians can identify optical communication links without disconnecting optical fibers or disrupting service. Furthermore, by reducing unwanted downtime, optical network service providers are able to reduce costs and resources associated with equipment and workforce typically needed to disconnect and reconnect service per test.

Figure 1B:
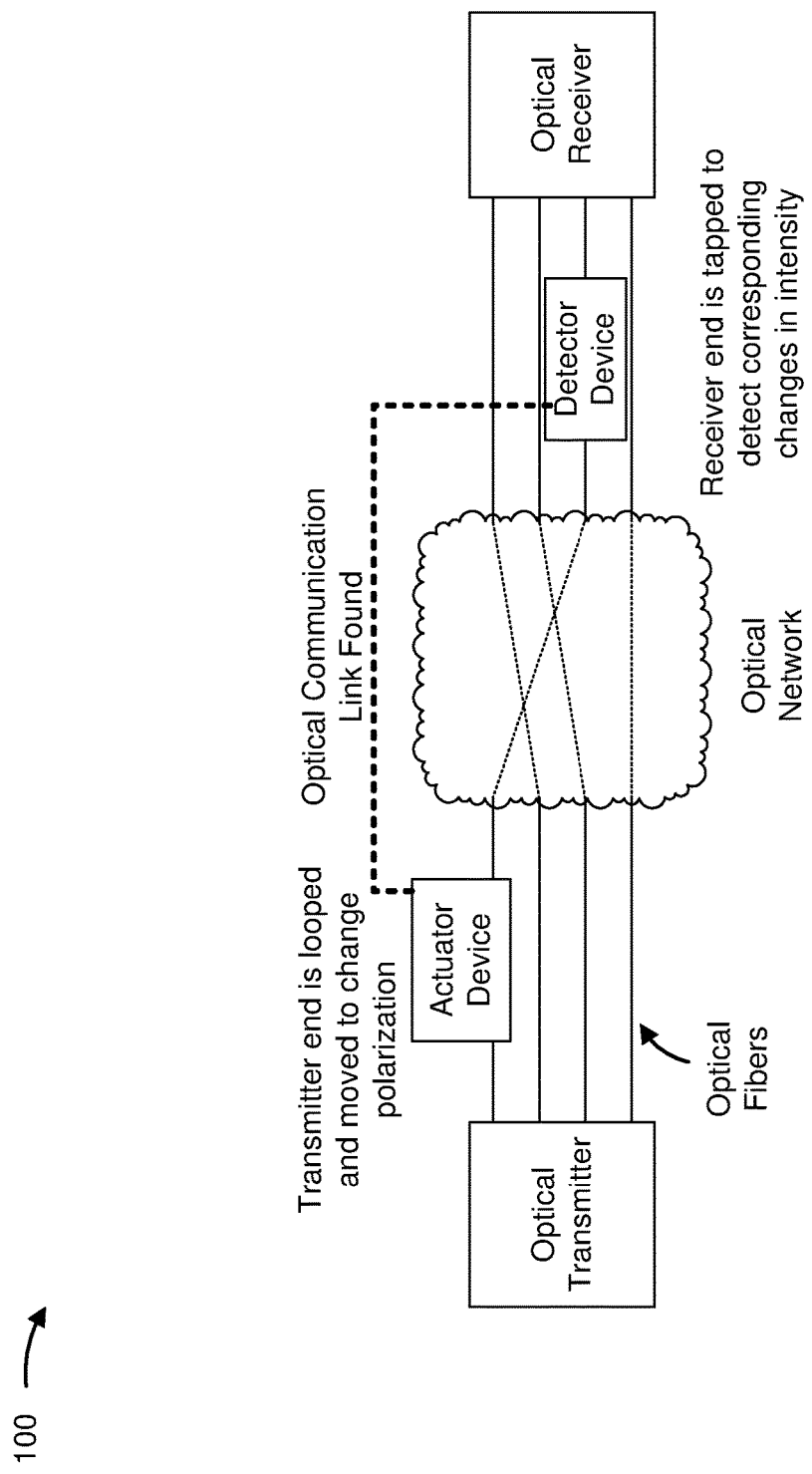

FIGS. 1A-1B are diagrams of one or more example implementations 100 described herein. As shown in FIGS. 1A-1B, the example implementation(s) 100 can include a plurality of network devices that are interconnected by an array of optical fibers to form an optical network. The network devices can include any one or more of optical transmitters, optical receivers, optical sources, amplifiers, repeaters, switches, multiplexers, splitters, circulators, or any other device suited to transmit and/or receive an optical signal. Optical signals can be provided using lasers, light emitting diodes (LEDs), and/or any other polarized light suitable for transmitting information over an optical network. The optical fibers can include glass fibers, glass-polymer fibers, polymer fibers, or any other medium suitable for transmitting optical signals.

In the example implementation(s) 100 of FIGS. 1A-1B, the network devices are shown as an optical transmitter and an optical receiver. The optical transmitter can be configured to transmit an optical signal through at least one optical fiber across an optical network to a designated optical receiver. Although one possible arrangement is shown, the example implementation(s) 100 can be provided in other arrangements. For example, additional optical transmitters and/or additional optical receivers can be used to transmit optical signals across the optical network and/or one or more additional optical networks. In some implementations, the optical transmitter can additionally function as an optical receiver and/or the optical receiver can additionally function as an optical transmitter. Furthermore, while only four optical communication links are shown, there can be fewer or additional optical communication links in some implementations.

As shown in FIGS. 1A-1B, an optical communication link identification system can be used to identify individual optical communication links (e.g., to test the ability for an optical fiber to carry optical signals from one point to another) within the optical network. The optical communication link identification system can include at least one actuator device and at least one detector device. The actuator device can be used to physically manipulate a section of a transmitter end of an individual optical fiber to cause a change in the optical signal that is detectable at a receiver end and distinguishable from other optical signals in the array of optical fibers. The detector device can be used to tap the receiver end of an individual optical fiber to identify the optical signal corresponding to the optical fiber being manipulated by the actuator device. Furthermore, and as discussed in more detail herein, the actuator device and the detector device can be configured to test optical communication links without disconnecting optical fibers or disrupting the optical signal.

In some implementations, the actuator device can be applied to the transmitter end of an optical fiber to be tested. Specifically, the actuator device can be configured to hold or retain the optical fiber that is wrapped or formed in at least a partial loop, such as one or more loops, without needing to disconnect the optical fiber. In some implementations, the actuator device can be open-faced or open-ended on one side to allow the optical fiber to be retained therein manually by hand and/or automatically by a feeding mechanism. The actuator device can further be configured to move the transmitter end of the optical fiber in a manner that causes changes in a polarization state of the optical signal. In some implementations, the actuator device can at least partially move one or more loops of the optical fiber about an axis at a fixed frequency to cause the polarization in the optical signal to change at a rate corresponding to the fixed frequency. In some implementations, the actuator device can cause one or more loops of the optical fiber to rotate, pivot, swing, oscillate, or otherwise move about one or more axes at a variable frequency to cause a polarization in the optical signal to change at a rate corresponding to the variable frequency.

In some implementations, the detector device can be applied to the receiver end of one of the optical fibers to check for an optical communication link with the optical fiber retained by the actuator device. The detector device can be configured to receive an optical fiber and sample or tap the optical signal without needing to disconnect the optical fiber. In some implementations, the detector device can be open-faced or open-ended on one side to allow the optical fiber to be retained therein manually by hand and/or automatically by a feeding mechanism. The detector device can further be configured to at least partially bend the optical fiber at an angle that is small enough to divert a portion of the optical signal from the optical fiber, but large enough so as not to impair the optical signal. In some implementations, the detector device can be configured to employ other mechanisms for tapping the optical signal.

In some implementations, the detector device can also filter the tapped optical signal. In some implementations, the detector device can apply a fixed polarizing filter that enables changes in polarization passing therethrough to exhibit corresponding changes in intensity. As referenced herein, change in intensity can correspond to changes in signal power, attenuation, photon energy, photon flux, and/or the like. Additionally, the detector device can be configured to detect such changes in intensity in the optical signal, determine that corresponding changes in polarization are present in the optical signal, and identify that an optical communication link exists with the optical fiber retained by the actuator device based on the changes in polarization. In some implementations, the detector device can be configured to identify an optical communication link as soon as a change in intensity is detected. In some implementations, the detector device can be configured to identify an optical communication link when the detected rate of change in intensity and the associated rate of change in polarization correspond to the particular frequency at which the actuator device moves the optical fiber.

In some implementations, each of the actuator device and the detector device can be configured for use with a single optical fiber. In some implementations, each of the actuator device and the detector device can be configured for use with multiple optical fibers. For example, the actuator device can be configured to simultaneously retain multiple optical fibers, and move each of the optical fibers at a different frequency to cause distinct changes in polarization. Similarly, the detector device can be configured to simultaneously tap multiple optical fibers, and identify each of the optical communication links based on distinct changes in intensity observed.

In some implementations, an actuator device designed for use with a single optical fiber can be used in conjunction with a detector device designed for use with multiple optical fibers. In some implementations, an actuator device designed for use with multiple optical fibers can be used in conjunction with a detector device designed for use with a single optical fiber. In some implementations, multiple actuator devices each designed for use with a single optical fiber can be used to simultaneously retain multiple corresponding optical fibers, and move each of the corresponding optical fibers at a different frequency to cause different changes in polarization. Similarly, multiple detector devices each designed for use with a single optical fiber can be used to simultaneously tap multiple corresponding optical fibers, and identify each of the corresponding optical communication links based on distinct changes in intensity observed.

In some implementations, the application of the actuator device to the transmitter end of the optical fiber, and/or the application of the detector device to the receiver end of the optical fiber, can be at least partially automated. For example, the actuator device can include or be provided with a feeding mechanism adapted to feed the transmitter end the optical fiber into the actuator device, and/or the detector device can include or be provided with a corresponding feeding mechanism adapted to feed the receiver end the optical fiber into the detector device. The feeding mechanism can include a machine, a robot, and/or any other mechanism that is locally disposed at the transmitter end and/or the receiver end of the optical fiber, and remotely operated (e.g., via instructions communicated from an operation center, a remote field technician, and/or the like, over wired and/or wireless connections). In this way, a field technician need not be dispatched on site to identify optical communication links and can test the optical fibers remotely.

As shown in FIG. 1A, the actuator device is applied to the transmitter end of a first optical fiber, and the detector device is applied to the receiver end of a second optical fiber that is different from the first optical fiber. In particular, the actuator device is configured to cause changes in the polarization in the optical signal carried by the first optical fiber, and the detector device is configured to detect changes in intensity corresponding to changes in polarization in the optical signal carried by the second optical fiber. Because there is no optical communication link between the transmitter end of the first optical fiber and the receiver end of the second optical fiber, and because the transmitter end of the second optical fiber is not being manipulated by the actuator device, the detector device does not detect any changes in intensity. Accordingly, the detector device can indicate that no optical communication link exists.

As shown in FIG. 1B, the actuator device is still applied to the transmitter end of the first optical fiber, but the detector device is now applied to the receiver end of the same first optical fiber. The actuator device is again configured to cause changes in the polarization in the optical signal carried by the first optical fiber, and the detector device is configured to detect changes in intensity corresponding to changes in polarization in the optical signal. Because there is an optical communication link between the transmitter end and the receiver end of the first optical fiber, the detector device detects changes in intensity corresponding to the changes in polarization caused by the actuator device. Accordingly, the detector device can indicate that an optical communication link does exist. In some implementations, the detector device and/or the optical communication link identification system can further be configured to indicate the presence or lack of an optical communication link using peripheral devices and/or communication interfaces capable of providing audible, visual, haptic, and/or otherwise detectable feedback.

In this way, the optical communication link identification system disclosed herein provides a solution for identifying optical communication links that utilizes existing optical signals rather than external light sources. By overcoming the need for external light sources, field technicians are able to identify optical communication links in less time, with fewer resources, at lower cost, and without disrupting service. Also, by providing an optical communication link identification system that is indifferent to the length of the optical communication link, field technicians are able to use a single system to test optical fibers of varying lengths. Furthermore, by reducing unwanted downtime, optical network service providers are able to reduce costs and resources associated with equipment and workforce typically needed to disconnect and reconnect service per test.

As indicated above, FIGS. 1A-1B are provided as examples. Other examples can differ from what is described with regard to FIGS. 1A-1B. The number and arrangement of devices and networks shown in FIGS. 1A-1B are provided as one or more examples. In practice, there may be additional devices and/or networks, fewer devices and/or networks, different devices and/or networks, or differently arranged devices and/or networks than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) of example implementation(s) 100 may perform one or more functions described as being performed by another set of devices of example implementation(s) 100.

Figure 2A:
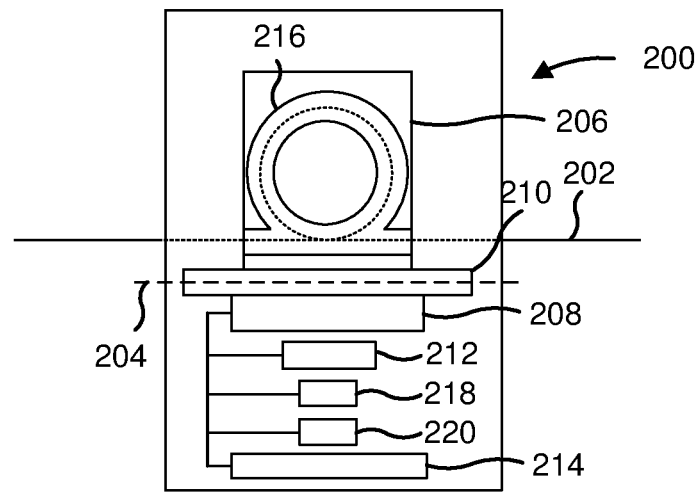
FIGS. 2A-2C are diagrams of one or more example implementations of an actuator device described herein.
Figure 2B:
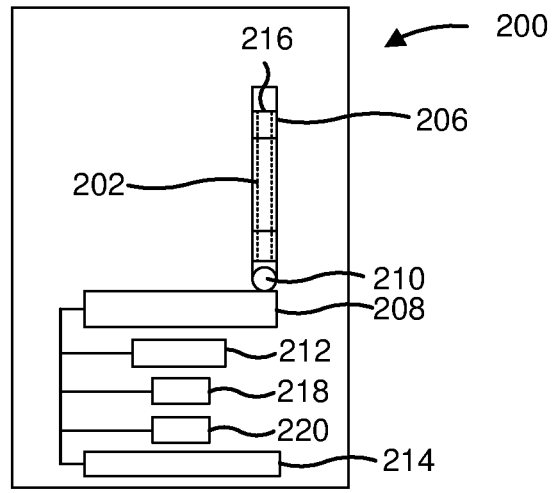
Figure 2C:
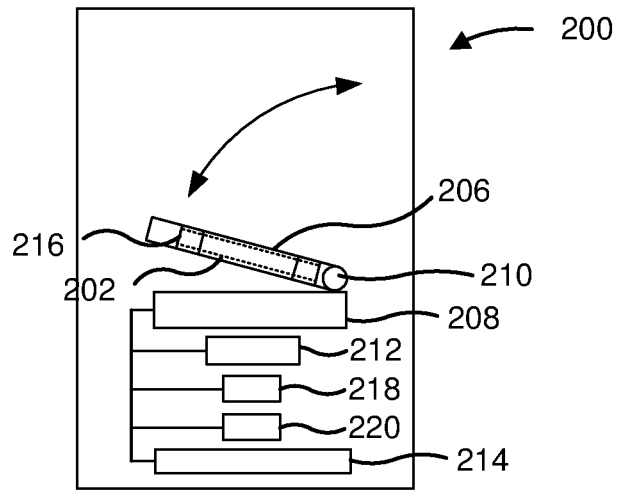

FIGS. 2A-2C are diagrams of one or more example implementations of an actuator device 200 described herein. The actuator device 200 can be configured to hold or retain a section of a transmitter end of an optical fiber 202 that is to transmit an optical signal, and cause the transmitter end of the optical fiber 202 to move about at least one axis 204 to cause changes in a polarization state of the optical signal.

As shown in the front planar view of FIG. 2A and the side planar view of FIG. 2B, for example, the actuator device 200 can include a plate 206, an actuator 208, a connector 210, a processor 212, and a power unit 214. Furthermore, as shown in the side planar view of FIG. 2C, the actuator 208 of the actuator device 200 can be configured to move the plate 206 and the transmitter end of the optical fiber 202 about the axis 204 at a particular frequency. In some implementations, the actuator device 200 can include multiple plates 206, and a corresponding arrangement of actuators 208 and connectors 210, configured to simultaneously retain and move multiple optical fibers 202 at different frequencies to cause distinct changes in polarization.

The plate 206 includes a planar surface that is sized to hold or receive one or more loops of the optical fiber 202 and formed of a polymer, a metal, a ceramic, a composite, and/or any other material that is sufficiently rigid to be moved by the actuator 208. In some implementations, the plate 206 additionally includes one or more rails 216 configured to hold or retain a section of the transmitter end of the optical fiber 202. The one or more rails 216 can be sized (e.g., with a sufficient radius) so as not to damage the optical fiber 202 or disrupt the optical signal. In some implementations, the one or more rails 216 can include grooves, tabs, recesses, guides, slots, or any other feature or component suited to retain the optical fiber 202. In some implementations, the plate 206 can be configured such that the optical fiber 202 can be received and retained without disconnecting the optical fiber 202 from the optical network. In some implementations, the plate 206 can be open-faced or open-ended on one side to allow the optical fiber 202 to be retained therein manually by hand and/or automatically by a feeding mechanism.

The actuator 208 includes a motor or any other actuatable device suited to cause the plate 206 to move. The actuator 208 can be coupled to the plate 206 and configured to cause the plate 206 and the transmitter end of the optical fiber 202 to move about the axis 204. The actuator 208 can be configured to move the plate 206 and the optical fiber 202 in a manner that causes changes in polarization and corresponding changes in intensity in the optical signal that is identifiable by a polarized photodetector at a receiver end of the optical fiber 202. In some implementations, the actuator 208 can be configured to rotate, pivot, swing, oscillate, or otherwise move the plate 206 about the axis 204 at a fixed frequency. In some implementations, the actuator 208 can be configured to rotate, pivot, swing, oscillate, or otherwise move the plate 206 at a variable frequency.

The connector 210 includes a pin, a sprocket, a cogwheel, a gear, or another mechanical component or mechanism suited to movably and operatively couple the actuator 208 to the plate 206. The connector 210 can be configured to couple the plate 206 to the actuator 208 in a manner that enables the actuator 208 to move the plate 206 about the axis 204. In some implementations, the connector 210 can be disposed along an axis that coincides with the axis 204, and configured to allow the plate 206 to move about the axis 204. In some implementations, the connector 210 can be configured to enable the actuator 208 to move the plate 206 about multiple axes.

The processor 212 includes any one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 212 can include one or more processors capable of being programmed to perform a function. The processor 212 can further include or otherwise have access to memory 218 in the form of random access memory (RAM), a read only memory (ROM), and/or another type of dynamic or static storage device (e.g., a flash memory, a magnetic memory, and/or an optical memory) that stores information and/or instructions for use by the processor 212.

In some implementations, the processor 212 can be provided in electrical communication with at least the actuator 208 and a communication interface 220. The processor 212 can be configured to operate the actuator 208 and cause the plate 206 to move the transmitter end of the optical fiber 202 about the axis 204. In some implementations, the processor 212 can selectively engage the actuator 208 to apply different types of actuation (e.g., differing in frequency and/or pattern of movement), and/or initiate the actuation at different times for different durations.

In some implementations, the processor 212 can further be adapted to communicate with an operation center, a remote field technician, and/or the like, over wired and/or wireless connections via the communication interface 220. For example, the processor 212 can be configured to receive instructions for enabling a feeding mechanism provided at the transmitter end of the optical fiber 202 to automatically feed the optical fiber 202 into the actuator device 200 or perform other automated processes. Additionally or alternatively, the processor 212 can be configured to enable a feeding mechanism provided at the receiver end of the optical fiber 302 to automatically feed the optical fiber 302 into the detector device 300 or perform other automated processes.

In some implementations, the processor 212 of the actuator device 200 can be configured to communicate with a processor of the detector device 300 (e.g., the processor 310 of FIG. 3A) over wired and/or wireless connections via the communication interface 220. For example, when the processor 212 initiates manipulation of the transmitter end of the optical fiber 202, the processor 212 can request or instruct the detector device 300 to begin monitoring for changes in intensity in the corresponding receiver end of the optical fiber 302. The processor 212 can use the communication interface 220 to further communicate to the detector device 300 the type of actuation to search for, the start time of the actuation, and/or the end time of the actuation. In some implementations, the processor 212 can be configured to receive instructions from the detector device 300 specifying the type of actuation to initiate, the time the actuation should start, and/or the time the actuation should end.

In some implementations, the processor 212 can be configured to exchange event information with the detector device 300 to further corroborate identification of optical communication links. For example, the processor 212 can be configured to transmit an event (e.g., "Oscillation Type A applied to Optical Communication Link X at 5:47:48 Universal Coordinated Time") to inform the detector device 300 of the type of actuation to detect and the timeframe within which the actuation can be detected. In some implementations, the processor 212 can be configured to receive an event (e.g., "Oscillation Type A detected on Optical Communication Link X at 5:48:03 Universal Coordinated Time") from the detector device 300 indicating that the optical communication link was verified, and correspondingly cease the actuation. Similarly, the processor 212 can be configured to exchange event information with the detector device 300 via the communication interface 220 relating to optical communication links that could not be verified.

The power unit 214 includes a power supply suited to enable the actuator 208. In some implementations, the power unit 214 includes a portable power supply, such as a rechargeable and/or replaceable battery, that is connected to the actuator 208. In some implementations, the power unit 214 includes power circuitry adapted to connect to external power sources. The power unit 214 can be disposed in electrical communication with at least the actuator 208 and configured to supply power sufficient to enable the actuator 208 to move the plate 206 and the optical fiber 202 at a particular frequency during testing. In some implementations, the power unit 214 can further be in electrical communication with the processor 212 and the communication interface 220.

As indicated above, FIGS. 2A-2C are provided as examples. Other examples can differ from what is described with regard to FIGS. 2A-2C. The number and arrangement of devices and components shown in FIGS. 2A-2C are provided as one or more examples. In practice, there may be additional devices and/or components, fewer devices and/or components, different devices and/or components, or differently arranged devices and/or components than those shown in FIGS. 2A-2C. Furthermore, two or more components shown in FIGS. 2A-2C may be implemented within a single component, or a single component shown in FIGS. 2A-2C may be implemented as multiple, distributed components.

Figure 3A:
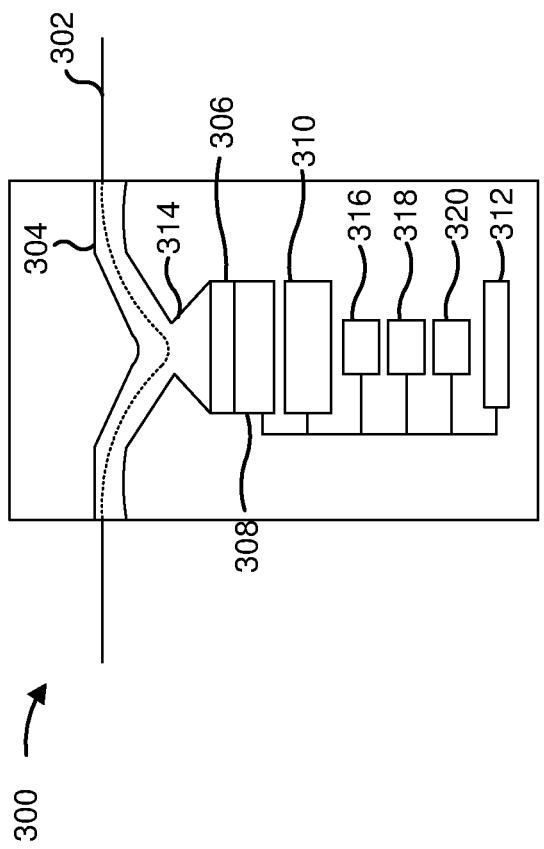
FIGS. 3A-3B are diagrams of one or more example implementations of a detector device described herein.
Figure 3B:
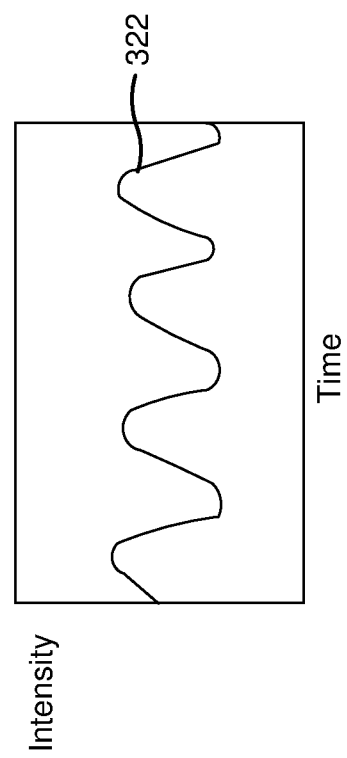

FIGS. 3A-3B are diagrams of one or more example implementations of a detector device 300 described herein. The detector device 300 can be configured to receive a receiver end of an optical fiber 302 that is to receive an optical signal, divert a portion of the optical signal from the optical fiber 302, filter the diverted portion of the optical signal, and detect changes in intensity in the optical signal. Based on any detected changes in intensity, the detector device 300 can be configured to determine changes in polarization in the optical signal caused by movements at a transmitter end of the optical fiber 302, and identify an optical communication link based on the changes in polarization. As shown in FIG. 3A, the detector device 300 can include a guide 304, a polarizer 306, a photodetector 308, a processor 310, and a power unit 312. In some implementations, the detector device 300 can include multiple sets of guides 304, polarizers 306, and photodetectors 308 configured to simultaneously tap multiple optical fibers 302 and distinguish between different changes in intensity observed.

The guide 304 is a structure that is formed of a polymer, a metal, a ceramic, a composite, and/or any other material suited to receive the optical fiber 302. In some implementations, the guide 304 includes a groove, a tab, a recess, a rail, a slot, or another feature or component suited to receive the optical fiber 302. In some implementations, the guide 304 is configured such that the optical fiber 302 can be received without disconnecting the optical fiber 302. For example, the guide 304 can be open-faced or open-ended on one side to allow the optical fiber 302 to be retained therein manually by hand and/or automatically by a feeding mechanism. Furthermore, the guide 304 can be configured to receive the receiver end of the optical fiber 302 in a manner that enables the optical signal to be tapped or sampled by the detector device 300 without disconnecting the optical fiber 302 from the optical network. In some implementations, the guide 304 can be configured to at least partially bend the optical fiber 302 to cause a portion of the optical signal to be diverted from the optical signal. As shown in FIG. 3A, the guide 304 can further form an aperture 314 that is positioned to receive the diverted optical signal. The guide 304 can be designed to bend the optical fiber 302 at an angle that is sufficiently small to enable the optical signal to be sampled, but sufficiently large to maintain the integrity of the optical signal.

The polarizer 306 includes a polarizing filter that is selected based on the type of light or optical signal being received and the type of polarization to be isolated. The polarizer 306 can be disposed in optical communication with the guide 304 and configured to filter the portion of the optical signal that is diverted from the optical fiber 302. For example, the polarizer 306 can be disposed within the aperture 314 and positioned to receive a sample of the optical signal. Furthermore, the polarizer 306 can be fixed relative to the guide 304 and configured such that changes in polarization of the optical signal passing through the polarizing filter exhibit corresponding changes in intensity.

The photodetector 308 includes any suitable sensor capable of detecting changes in intensity in an optical signal (e.g., capable of converting photons to electrical current). The photodetector 308 can be coupled to the polarizer 306 and configured to detect changes in intensity in the sampled and filtered portion of the optical signal. Furthermore, the photodetector 308 can be disposed in optical communication with the polarizer 306 such that any optical signals received by the photodetector 308 are filtered or polarized by the polarizer 306. Passing the optical signal through the polarizer 306 can cause specific polarizations of the optical signal to be isolated, and thereby cause a differentiation in signal intensity that can be detected by the photodetector 308.

The processor 310 includes any one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 310 can include one or more processors capable of being programmed to perform a function. The processor 310 can further include or otherwise have access to memory 316 in the form of random access memory (RAM), a read only memory (ROM), and/or another type of dynamic or static storage device (e.g., a flash memory, a magnetic memory, and/or an optical memory) that stores information and/or instructions for use by the processor 310.

In some implementations, the processor 310 can be provided in electrical communication with the photodetector 308, a peripheral device 318, and a communication interface 320. The processor 310 can be configured to determine changes in polarization in the optical signal based on any changes in intensity detected by the photodetector 308, as shown by the example photodetector output waveform 322 of FIG. 3B. Furthermore, the processor 310 can be configured to identify an optical communication link between a transmitter end and a receiver end of an optical fiber 302 based on the changes in polarization. In some implementations, the processor 310 can determine whether changes in polarization are caused by movement of the transmitter end of the optical fiber, such as those caused by the actuator device 200. If the changes in intensity detected by the detector device 300 at the receiver end of an optical fiber 302 correspond to changes in polarization that are caused by the actuator device 200 at the transmitter end, the processor 310 can be configured to confirm and identify an optical communication link. The processor 310 can use the peripheral device 318 to provide audible, visual, and/or haptic feedback to indicate whether an optical communication link exists.

In some implementations, the processor 310 can be configured to determine that changes in polarization in the optical signal are caused by an oscillation of the transmitter end of the optical fiber 302 at a particular frequency. In some implementations, the processor 310 can be configured to compare changes in intensity, such as a rate of change of intensity over time, and the particular frequency that corresponds to the movement caused by the actuator device 200. If the rate of change of intensity detected at the receiver end of the optical fiber 302 corresponds to the particular frequency, the processor 310 can be configured to identify the optical communication link between the transmitter end and the receiver end of the optical fiber 302.

In some implementations, the processor 310 can further be adapted to communicate with an operation center, a remote field technician, and/or the like, over wired and/or wireless connections via the communication interface 320. For example, the processor 310 can be configured to receive instructions for enabling a feeding mechanism provided at the receiver end of the optical fiber 302 to automatically feed the optical fiber 302 into the detector device 300 or perform other automated processes. Additionally or alternatively, the processor 310 can be configured to enable a feeding mechanism provided at the transmitter end of the optical fiber 202 to automatically feed the optical fiber 202 into the actuator device 200 or perform other automated processes.

In some implementations, the processor 310 can be configured to use the communication interface 320 to communicate with the communication interface 220 of the processor 212 of the actuator device 200 over wired and/or wireless connections. In some implementations, the processor 310 can request or instruct the actuator device 200 to manipulate the transmitter end of the optical fiber 202. For example, the processor 310 can specify the type of actuation (e.g., the frequency and/or pattern of movement) that the actuator device 200 should engage, and/or the duration (e.g., start and end times) of the actuation. In turn, the processor 310 can be configured to distinguish and identify optical communication links based on the type and/or duration of actuation specified to the actuation device 200.

In some implementations, the processor 310 can be configured to exchange event information with the processor 212 to further corroborate identification of optical communication links. For example, the processor 212 of the actuator device 200 can be configured to transmit an event (e.g., "Oscillation Type A applied to Optical Communication Link X at 5:47:48 Universal Coordinated Time") to inform the processor 310 of the detector device 300 of the type of actuation to detect and the timeframe within which the actuation can be detected. In some implementations, the processor 310 of the detector device 300 can transmit an event (e.g., "Oscillation Type A detected on Optical Communication Link X at 5:48:03 Universal Coordinated Time") to the processor 212 of the actuator device 200 to indicate that the optical communication link was verified and to instruct the actuator device 200 to cease the actuation. Similarly, the processor 310 can be configured to exchange event information with the actuator device 200 via the communication interface 320 relating to optical communication links that could not be verified.

The power unit 312 of the detector device 300 can be disposed in electrical communication with at least the photodetector 308 and the processor 310, and can be configured to supply power sufficient to enable the photodetector 308 and the processor 310 to detect changes in intensity in the optical signal. In some implementations, the power unit 312 can include one or more portable power supplies, such as rechargeable and/or replaceable batteries, that are connected to the photodetector 308 and the processor 310. In some implementations, the power unit 312 can include power circuitry adapted to connect the photodetector 308 and the processor 310 to external power sources. In some implementations, the power unit 312 can further be in electrical communication with the peripheral device 318 and the communication interface 320.

As indicated above, FIGS. 3A-3B are provided as examples. Other examples can differ from what is described with regard to FIGS. 3A-3B. The number and arrangement of devices and components shown in FIGS. 3A-3B are provided as one or more examples. In practice, there may be additional devices and/or components, fewer devices and/or components, different devices and/or components, or differently arranged devices and/or components than those shown in FIGS. 3A-3B. Furthermore, two or more components shown in FIGS. 3A-3B may be implemented within a single component, or a single component shown in FIGS. 3A-3B may be implemented as multiple, distributed components.

Figure 4:
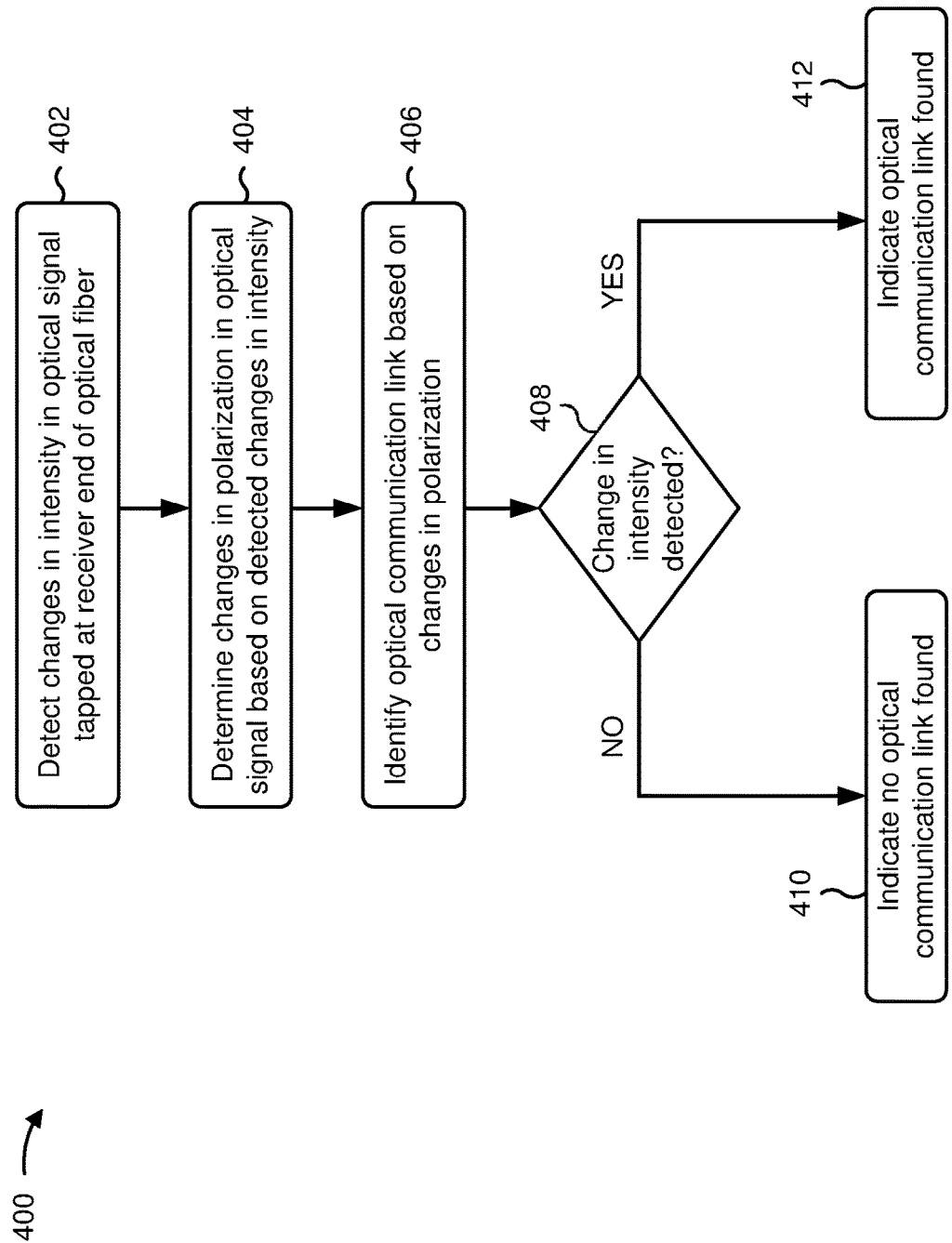
FIG. 4 is a flow chart of an example process for identifying an optical communication link.

FIG. 4 is a flow chart of an example process 400 for identifying an optical communication link. In some implementations, one or more process blocks of FIG. 4 can be performed by a detector device (e.g., the detector device 300 using the photodetector 308 and/or the processor 310). In some implementations, one or more blocks of FIG. 4 can be performed in combination with another device or a group of devices separate from the detector device (e.g., the actuator device 200 using the processor 212, and/or another processor that is otherwise in communication with one or more of the actuator device 200 or the detector device 300).

As shown in FIG. 4, the process 400 can include detecting changes in intensity in an optical signal that is tapped or sampled at a receiver end of an optical fiber (block 402). For example, the detector device (e.g., the detector device 300 using the polarizer 306, the photodetector 308, the processor 310, and/or the like) can detect changes in intensity in the optical signal corresponding to changes in polarization introduced at a transmitter end of the optical fiber by an actuator device (e.g., the actuator device 200 using the plate 206, the actuator 208, the connector 210, the processor 212, and/or the like), as described above.

As further shown in FIG. 4, the process 400 can also include determining changes in polarization in the optical signal based on detected changes in intensity (block 404). For example, the detector device (e.g., the detector device 300 using the polarizer 306, the photodetector 308, the processor 310, and/or the like) can use detected changes in intensity to determine whether corresponding changes in polarization are present in the optical signal, as described above.

As further shown in FIG. 4, the process 400 can include identifying an optical communication link between the transmitter end and the receiver end of the optical fiber based on the determined changes in polarization (block 406). For example, the detector device (e.g., the detector device 300 using the polarizer 306, the photodetector 308, the processor 310, and/or the like) can determine whether the determined changes in polarization are sufficiently indicative of an optical communication link between the transmitter end and the receiver end of the optical fiber. In some implementations, the process 400 can be configured to identify whether an optical communication link exists as soon as any type of change in polarization is detected, as described above.

As further shown in FIG. 4, if sufficient changes in polarization are not detected (block 408—NO), then the process 400 can include indicating that no optical communication link exists between the transmitter end and the receiver end of the optical fiber (block 410). For example, the detector device (e.g., the detector device 300 using the processor 310, the peripheral device 318, and/or the communication interface 320) can provide audible, visual, haptic, and/or otherwise detectable feedback to indicate that there is no optical communication link between the transmitter end and the receiver end of the optical fiber, as described above.

As further shown in FIG. 4, if sufficient changes in polarization are detected (block 408—YES), then the process 400 can include indicating that an optical communication link exists between the transmitter end and the receiver end of the optical fiber (block 412). For example, the detector device (e.g., the detector device 300 using the processor 310, the peripheral device 318, and/or the communication interface 320) can provide audible, visual, haptic, and/or otherwise detectable feedback to indicate that there is an optical communication link between the transmitter end and the receiver end of the optical fiber, as described above.

The process 400 can include additional implementations, such as any single implementation or any combination of implementations described below and/or in connection with one or more other processes described elsewhere herein.

In one implementation, identifying an optical communication link between the transmitter end and the receiver end of the optical fiber can include comparing the change in intensity in the portion of the optical signal diverted from the optical fiber and a particular frequency that corresponds to the change in polarization that is caused by the movement of the transmitter end of the optical fiber; and identifying the optical communication link between the transmitter end and the receiver end based on correlations between the change in intensity and the particular frequency. In some implementations, a rate of change of intensity and a corresponding rate of change of polarization can be compared with the particular frequency to identify the optical communication link.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustrations and descriptions, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

To the extent the aforementioned embodiments collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Collection, storage, and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
    a guide to:
        receive a receiver end of an optical fiber that is to receive an optical signal,
            wherein the guide includes at least one of:
                a groove,
                a recess, or
                a slot,
            wherein the at least one of the groove, the recess, or the slot is to divert a portion of the optical signal from the optical fiber, and
            wherein the guide forms an aperture,
                wherein the aperture is to receive the portion of the optical signal diverted from the optical fiber;
    a polarizer to:
        filter the portion of the optical signal diverted from the optical fiber;
    a photodetector coupled to the polarizer to:
        detect a change in intensity in the portion of the optical signal diverted from the optical fiber;
    a processor in communication with the photodetector to:
        determine a change in polarization in the optical signal based on the change in intensity in the portion of the optical signal diverted from the optical fiber,
            wherein the change in polarization is caused by a movement of a transmitter end of the optical fiber, and
        identify an optical communication link between the transmitter end and the receiver end based on the change in polarization; and
    a power unit in communication with the photodetector and the processor.

2. The device of claim 1, wherein the guide is to at least partially bend the receiver end of the optical fiber to cause the portion of the optical signal to be diverted from the optical signal.

3. The device of claim 1, wherein the photodetector is in optical communication with the polarizer.

4. The device of claim 1, wherein the processor is to determine the change in polarization in the optical signal based on the change in intensity in the portion of the optical signal diverted from the optical fiber,
    wherein the change in polarization is caused by an oscillation of the transmitter end of the optical fiber at a particular frequency.

5. The device of claim 1, wherein the processor further:
    compares the change in intensity in the portion of the optical signal diverted from the optical fiber and a particular frequency,
        wherein the particular frequency corresponds to the change in polarization that is caused by the movement of the transmitter end of the optical fiber, and
    identify the optical communication link between the transmitter end and the receiver end based on correlations between the change in intensity and the particular frequency.

6. A system, comprising:
    a first device including:
        a plate to:
            retain a transmitter end of an optical fiber that is to transmit an optical signal,
                wherein the plate includes at least one of:
                    a groove,
                    a recess, or
                    a slot, and
                wherein the at least one of the groove, the recess, or the slot is to retain the transmitter end of the optical fiber in at least a partial loop,
        an actuator coupled to the plate to:
            cause the plate and the transmitter end of the optical fiber to move about at least one axis,
                wherein the actuator is to move the plate to cause a change in polarization in the optical signal, and
        a connector to:
            couple the plate to the actuator, and
            wherein the connector enables the plate to move about the at least one axis;
    a second device including:
        a guide to:
            receive a receiver end of the optical fiber that is to receive the optical signal,
                wherein the guide is to divert a portion of the optical signal from the optical fiber, and
                wherein the guide forms an aperture,
                    wherein the aperture is to receive the portion of the optical signal diverted from the optical fiber; and
        a polarizer to:
            filter the portion of the optical signal diverted from the optical fiber,
        a photodetector coupled to the polarizer to:
            detect a change in intensity in the portion of the optical signal diverted from the optical fiber, and
        a processor in communication with the photodetector to:
            determine the change in polarization in the optical signal based on the change in intensity in the portion of the optical signal diverted from the optical fiber, and
            identify an optical communication link between the transmitter end and the receiver end based on the change in polarization.

7. The system of claim 6, wherein the plate includes one or more rails that are to retain one or more loops of the transmitter end of the optical fiber.

8. The system of claim 6, wherein the connector is disposed along the at least one axis,
wherein the actuator is to move the plate and the transmitter end of the optical fiber about the at least one axis at a particular frequency.

9. The system of claim 6, wherein the guide is to bend the receiver end of the optical fiber to cause the portion of the optical signal to be diverted.

10. The system of claim 6, wherein the first device further comprises a processor in communication with the actuator to:
operate the actuator and cause the plate to move the transmitter end of the optical fiber about the at least one axis, and
communicate with the processor of the second device.

11. The system of claim 6, wherein the actuator is to move the plate and the transmitter end of the optical fiber about the at least one axis at a particular frequency,
wherein the processor further:
compares the change in intensity in the portion of the optical signal diverted from the optical fiber and the particular frequency, and
identifies the optical communication link between the transmitter end and the receiver end based on correlations between the change in intensity and the particular frequency.

12. The system of claim 6, wherein the polarizer is disposed within the aperture.

13. The system of claim 6, wherein the photodetector is in optical communication with the polarizer.

14. The system of claim 6, wherein plate is open-ended or open-faced on one side.

15. A device, comprising:
a guide to:
receive a receiver end of an optical fiber that is to receive an optical signal,
wherein the guide includes at least one of:
a groove,
a recess, or
a slot,
wherein the at least one of the groove, the recess, or the slot is to divert a portion of the optical signal from the optical fiber, and
wherein the guide forms an aperture;
a polarizer to:
filter the portion of the optical signal diverted from the optical fiber,
wherein the polarizer is disposed within the aperture;
a photodetector coupled to the polarizer to:
detect a change in intensity in the portion of the optical signal diverted from the optical fiber;
a processor in communication with the photodetector to:
determine a change in polarization in the optical signal based on the change in intensity in the portion of the optical signal diverted from the optical fiber,
wherein the change in polarization is caused by a movement of a transmitter end of the optical fiber, and
identify an optical communication link between the transmitter end and the receiver end based on the change in polarization; and
a power unit in communication with the photodetector and the processor.

16. The device of claim 15, wherein the photodetector is in optical communication with the polarizer.

17. The device of claim 15, wherein the processor is to determine the change in polarization in the optical signal based on the change in intensity in the portion of the optical signal diverted from the optical fiber,
wherein the change in polarization is caused by an oscillation of the transmitter end of the optical fiber at a particular frequency.

18. The device of claim 15, wherein the processor is further to:
compare the change in intensity in the portion of the optical signal diverted from the optical fiber and a particular frequency,
wherein the particular frequency corresponds to the change in polarization that is caused by the movement of the transmitter end of the optical fiber.

19. The device of claim 18, wherein the processor is further to:
identify the optical communication link between the transmitter end and the receiver end based on correlations between the change in intensity and the particular frequency.

20. The device of claim 15, wherein the guide is to at least partially bend the receiver end of the optical fiber to cause the portion of the optical signal to be diverted from the optical signal.

* * * * *